United States Patent [19]
Egnaczak

[15] 3,695,755
[45] Oct. 3, 1972

[54] PHOTOELECTROPHORETIC CAMERA
[72] Inventor: Raymond K. Egnaczak, Williamson, N.Y.
[73] Assignee: Xerox Corporation, Stamford, Conn.
[22] Filed: Oct. 28, 1970
[21] Appl. No.: 84,715

[52] U.S. Cl. ...........................355/3, 95/13, 96/1.3, 118/637, 355/27
[51] Int. Cl. ..............................................G03g 15/00
[58] Field of Search ........355/3, 4, 17, 27; 95/13, 14; 96/1, 1.2, 1.3; 117/17.5; 118/637

[56] References Cited

UNITED STATES PATENTS 3,499,709   3/1970   Uhlenberg.....................355/3
3,542,465   11/1970  Pundsack et al...........95/13 X

*Primary Examiner*—Samuel S. Matthews
*Assistant Examiner*—Robert P. Greiner
*Attorney*—James J. Ralabate, David C. Petre and Michael H. Shanahan

[57] ABSTRACT

A camera employing the photoelectrophoretic process has a roller mounted to travel over a transparent flat plate. A disposable film sheet containing an ink pod is stretched over the flat plate and a disposable processor sheet is anchored at one end and coupled to the roller at the other. Photoelectrophoretic ink in the film sheet ink pod is spread over the film sheet when the roller is moved across the film sheet. The ink between the processor and film sheets is exposed to light and electric field as the roller travels over the flat plate thereby forming images on the film sheet and the processor sheet. The processor sheet is wound onto the roller during the travel of the roller over the flat plate.

8 Claims, 7 Drawing Figures

PATENTED OCT 3 1972 3,695,755

INVENTOR.
RAYMOND K. EGNACZAK
BY
*Michael H Shanahan*
ATTORNEY

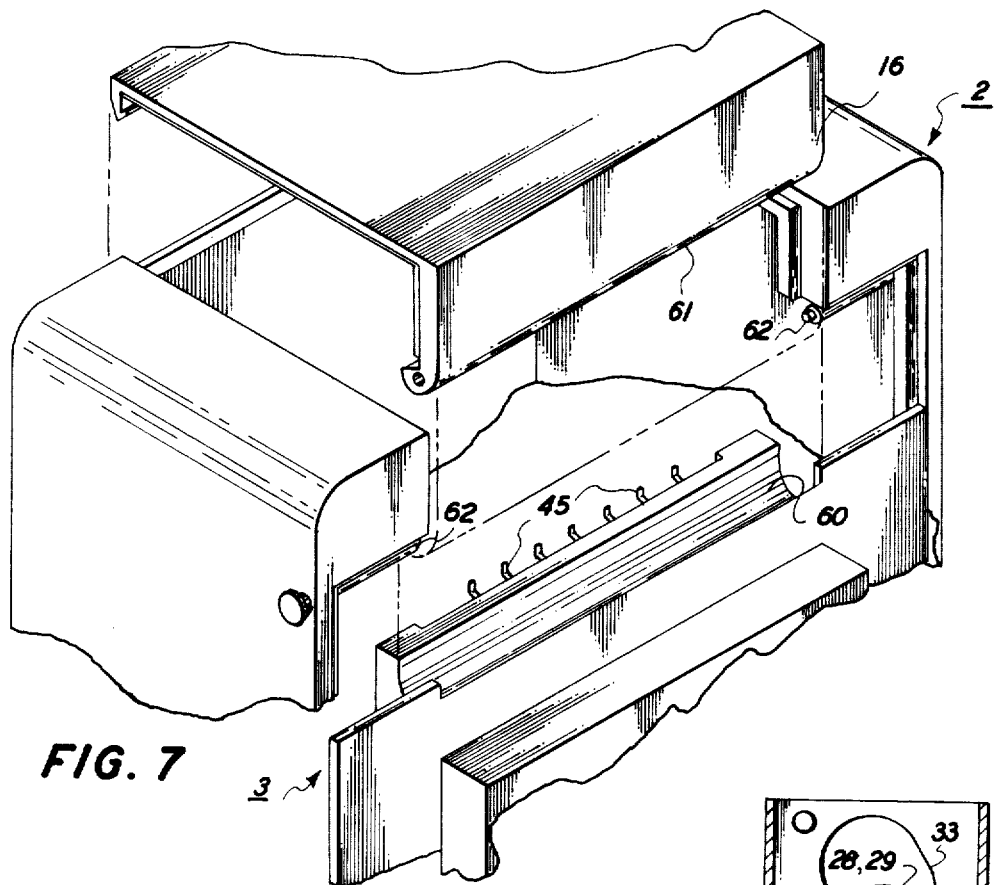
FIG. 7
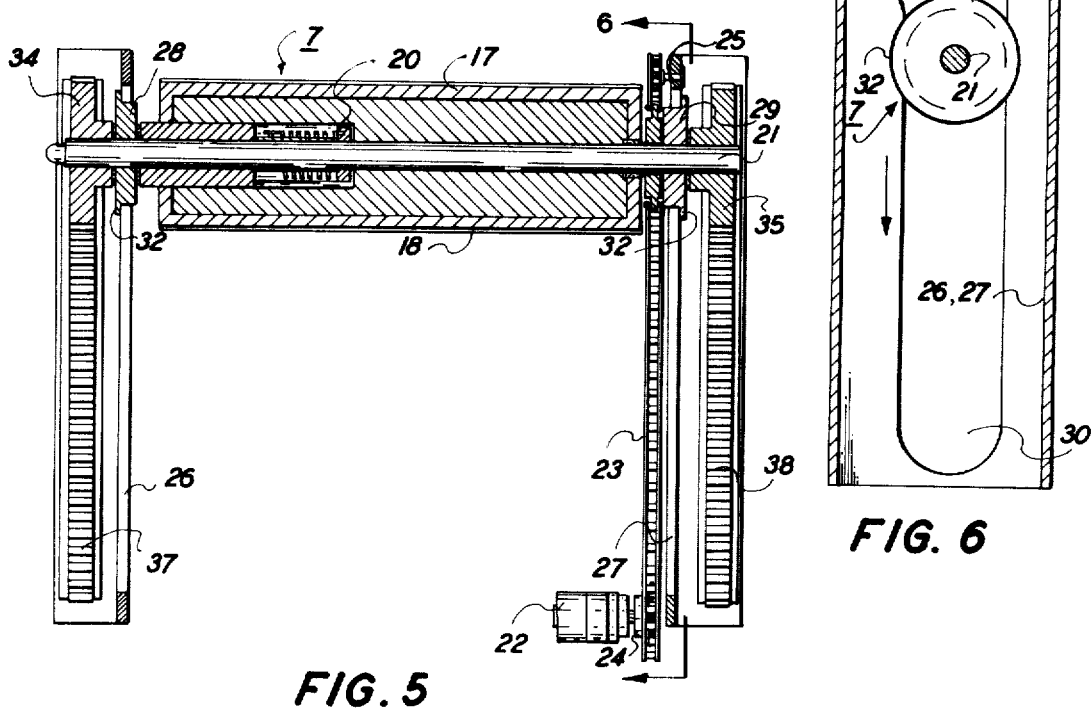
FIG. 5
FIG. 6

PHOTOELECTROPHORETIC CAMERA

BACKGROUND OF THE INVENTION

This invention relates to imaging systems and in particular to novel method and apparatus for the photoelectrophoretic imaging process. Even more specifically, this invention relates to a photoelectrophoretic camera.

In the photoelectrophoretic imaging process, an image is formed form an imaging suspension or ink by subjecting the ink to an electric field and exposing it to activating electromagnetic radiation, e.g., light in the visible spectrum. The imaging suspension is composed of light sensitive particles suspended within an insulating liquid carrier. The particles are believed to bear a net electrical charge while in suspension. Conventionally, the ink is placed between injecting and blocking electrodes used to establish the electric field and is exposed to a light image through one of the electrodes which is at least partially transparent. According to one theory, particles attracted to the injecting electrode by the electric field exchange charge with the injecting electrode when exposed to light and migrate under the influence of the field through the liquid carrier to the blocking electrode. As a result of the migration, positive and negative images are formed on the two electrodes. The blocking electrode is covered with a dielectric material to minimize charge exchange and thereby prevent the particles from oscillating back and forth between the two electrodes.

The photoelectrophoretic imaging process is either monochromatic or polychromatic depending upon whether the light sensitive particles within the liquid carrier are responsive to the same or different portions of the light spectrum. A full color polychromatic system is obtained, for example, by using cyan, magenta and yellow colored particles which are responsive to red, green and blue light respectively. An extensive and detailed description of the photoelectrophoretic process is found in U. S. Pat. Nos. 3,384,565 and 3,384,484 to Tulagin and Carreira, 3,383,993 to Yeh and 3,384,566 to Clark.

Present photoelectrophoretic imaging systems employ injecting and blocking electrodes (hereafter occasionally referred to generically as "imaging electrodes" because complementary positive and negative images are formed on them) that are rollers or drums, flat or curved plates or, in some instances, webs or sheets. Conventionally, images or copies are formed in a line-by-line fashion in a narrow nip (interface area) between electrodes as one electrode moves relative to the other. Various combinations of these electrodes have been successfully used in a variety of system embodiments capable of producing high quality images. There is a continuing need, however, for simple mechanical configurations that are portable or at least compact in order to perform the functions of familiar hand-held or tripod mounted cameras.

Accordingly, it is an object of this invention to enhance the photoelectrophoretic process by devising noncomplex configurations for carrying out the process.

A specific object of the present invention is to build a portable camera capable of employing the photoelectrophoretic process.

Yet another object of the instant invention is to devise novel steps for the photoelectrophoretic process that enable the apparatus for practising the process to be simplified.

Another object of the invention is to devise method and means for full frame exposure of a photoelectrophoretic ink.

Still a further object of this invention is to devise means and methods for adapting rupturable ink pods to the photoelectrophoretic process.

It is also an object of this invention to employ, in novel methods and configurations, disposable materials in the photoelectrophoretic process.

These and other objects of the instant invention are realized by modifying the basic roller and flat plate electrode configurations for imaging electrodes. A single roller electrode is used that performs the normally understood role of a blocking electrode. It is combined with a disposable blocking layer and, if desired, multiple imaging passes can be made with the one roller by inserting fresh blocking layers between passes. The motion of the roller is used to: rupture a pod containing a photoelectrophoretic ink; spread the ink over a flat plate electrode; photoelectrophoretically deposit the pigments or particles in the ink onto the flat plate; and separate the two electrodes to yield the desired copy. The flat plate electrode is covered with a film sheet that contains the rupturable pod and the final support member for the ink copy. The apparatus in which these items are employed is referred to as a camera since it contains a bellows and lens capable of projecting images of remote objects onto the ink between the system electrodes. Of course, it is understood that the optical input or exposure means can be modified to resemble that used in office copying equipment.

The camera operation is quite simple. The film sheet is loaded into the camera over a transparent, conductive flat plate. A processor sheet is stretched over the film sheet being coupled to a conductive roller at one end and anchored at the other. The roller is moved over the rupturable pod on the film sheet breaking the pod open to release a photoelectrophoretic ink. The release of the ink is controlled because the processor sheet is positioned over the film sheet to constrain the ink. Appropriate voltages are coupled to the roller and flat plate to subject the ink between them to a high electric field. The camera shutter is open during the travel of the roller to expose the ink subjected to the field to an image pattern of activating electromagnetic radiation. Consequently, images are formed on the film and processor sheets in a line by line fashion as the roller travels over the flat plate. The processor sheet is wound onto the roller during its travel but otherwise there is substantially no relative movement between the film and processor sheets during the travel of the roller. The exposure step may be repeated by stretching the same or a new processor sheet over the formed ink copy on the film sheet and once again passing the roller over the flat plate. Thereafter, the film sheet is removed from the camera and another one is inserted for formation of the next copy. The image forming area on the film sheet is transparent but it is converted to an opaque original simply by backing the film sheet with an opaque sheet.

One variation to the above process steps is to use a first pass of the roller over the flat plate in the dark to electrophoretically deposit the ink over the film sheet. After the first roller pass, the roller is returned to its original position and once again passed over the roller but this time with both the field applied and the camera shutter open. Furthermore, if the processor sheet is conductive so as to permit a field to be established across the ink spread over the film sheet, full frame exposure of the ink may be followed by passing the roller over the flat plate in the dark.

DESCRIPTION OF THE DRAWINGS

Other objects and features of the present invention will be apparent from this specification and from the drawings which are:

FIG. 5 is a schematic plan view of a drive mechanism for the camera roller.

FIG. 6 is a schematic side view of the guide slot for bringing the roller into contact with the flat plate.

FIG. 7 is a schematic partial perspective view of the camera housing showing various components in exploded positions.

DESCRIPTION OF THE INVENTION

Figure 2:
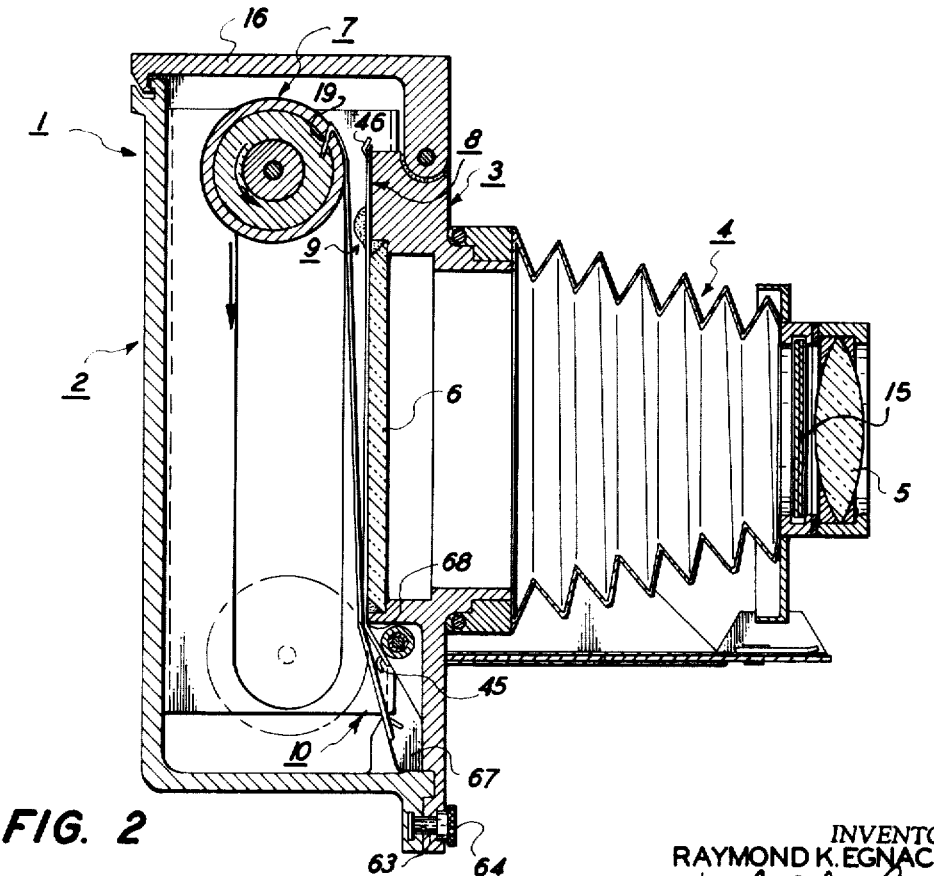
FIG. 2 is a schematic, side elevation sectional view of the instant camera.

The camera 1 of the present invention is shown in cross section in FIG. 2. Some of its major components are the housing 2, support frame 3, bellows 4, lens 5, transparent flat plate 6, roller 7, film sheet 8 with its rupturable ink pod 9 and processor sheet 10.

Briefly, copies are formed by pressing the roller against the pod to release the ink and by spreading the ink across the film sheet by passing the roller over it. Voltages are coupled to the roller and flat plate to establish an electric field sufficient for imaging across the ink between and adjacent the roller and flat plate. The camera shutter 15 is open during the travel of the roller to expose the ink subjected to the electric field to activating electromagnetic radiation in imagewise configuration. The image or ink copy formed on the film sheet is normally a positive image which may now be removed from the camera as the final end product. Alternately, the ink copy on the film sheet may be exposed a second time with more electrically insulating carrier fluid added between the processor and film sheets. Preferably, a clean surface processor sheet is installed before the roller is returned to the position near the top of the camera. This change of processor sheets may be done in a dark room or alternately by entering the camera through the access door 16 as the roller is being returned to the pod position (that position in which the processor sheet is forced against the film sheet while the roller is located near the pod). The voltages are once again applied and the ink comprising the image is exposed by opening the shutter 15. The same exposure steps may, of course, be repeated again. The multiple exposures are intended to increase the quality of the ink copy formed during the first exposure and often are not necessary because of the excellent quality obtained with a single exposure.

Another mode of operation is to move the roller over the flat plate with the electric field applied but with shutter 15 closed. The electric field causes electrophoretic deposition of particles in the ink onto the film sheet and/or the processor sheet. Once the ink is spread over the entire film sheet, the roller is pushed backward across the flat plate to its original position. If the field is applied during the reverse travel the ink particles are once again subjected to electrophoretic deposition. Thereafter, the shutter 15 is opened and the roller is once again passed over the flat plate. The electrophoretic deposition has proven to be advantageous with the photoelectrophoretic imaging process.

An alternative to the immediately preceding embodiment is to add a conductive backing to the processor sheet. Once the ink is spread over the film sheet, the roller returned to its pod position, the shutter 15 is opened and the voltages are applied to the flat plate and the conductive backing on the processor sheet. The migration of ink particles takes place generally simultaneously over the entire surface of the film sheet. (That is, migration occurs in areas where ink particles are exposed to radiation and subjected to field.) The migrated and non-migrated ink particles are separated in a line by line fashion as the processor sheet is wound onto the roller which can occur in this embodiment after shutter 15 is closed.

In the preceding two embodiments, the roller is rotated and translated across the flat plate at about the same speeds for both directions of travel. No special gear mechanism is used. A rack and pinion mechanism allows the direction of rotation to be reversed simply by reversing the direction of translation. The ink is not unduly affected during the reverse (from bottom to top as seen in FIG. 2) travel of the roller. In fact, the ink can be spread over the film sheet during the forward (from top to bottom as seen in FIG. 2) travel of the roller without the voltage being applied and electrophoretically deposited during reversal travel by applying the electric field during that time.

Figure 3:
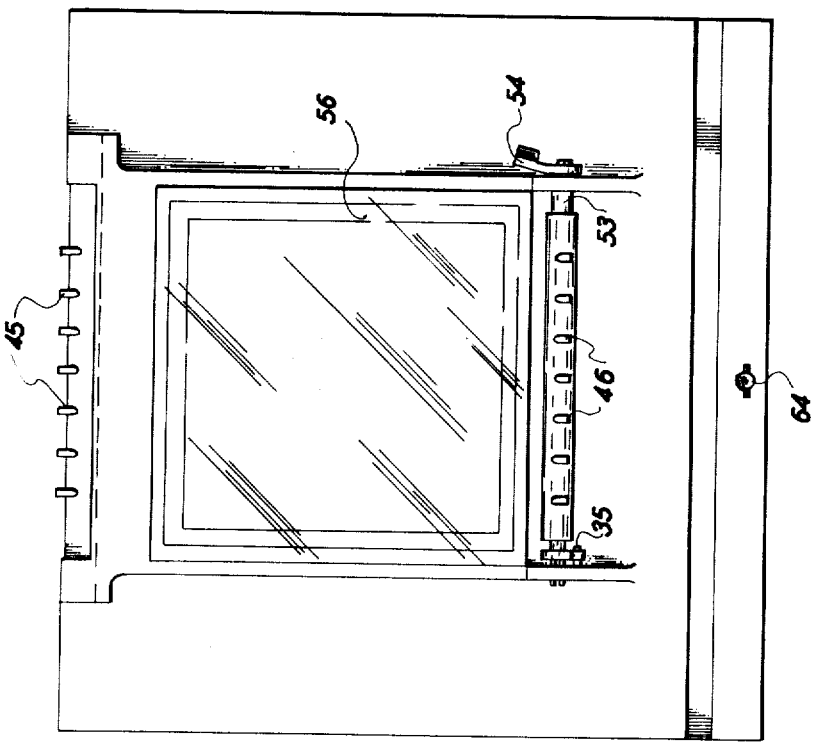
FIG. 3 is a schematic, elevation view of the flat plate and associated support looking toward the bellows and lens.
Figure 4:
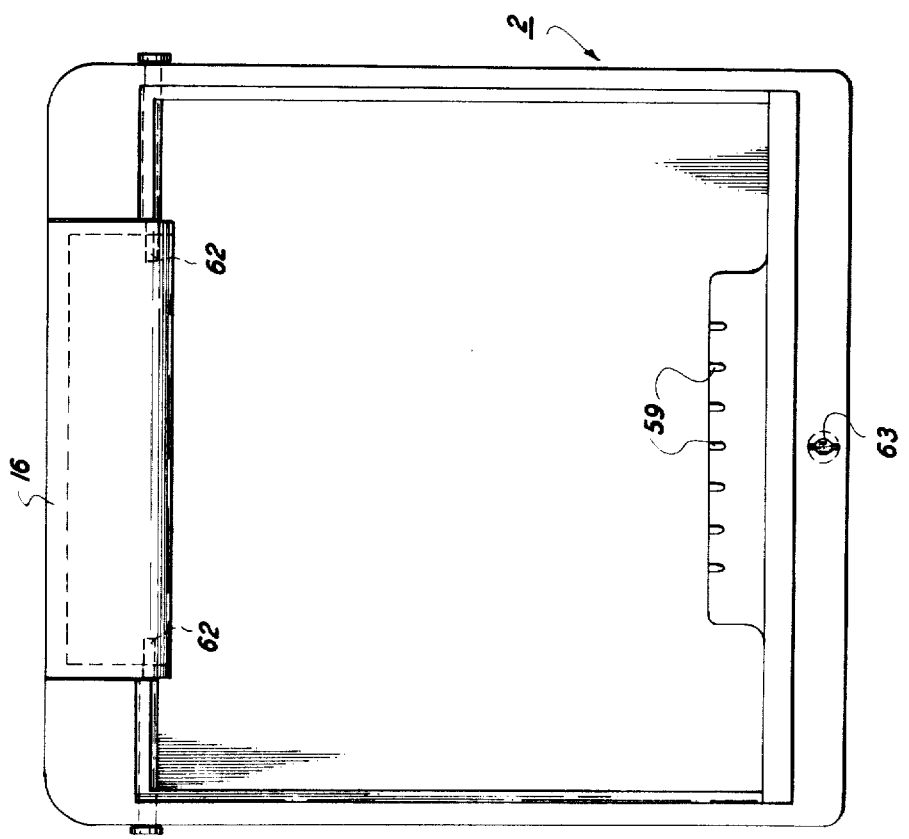
FIG. 4 is a schematic, elevation view of the camera housing looking away from the bellows and lens.

Functionally, the flat plate is primarily a rigid support for the film sheet and includes a transparent conductive coating facing the film sheet that is one of the electrodes used for applying a field across the ink. The processor sheet and roller both include conductive layers that serve as another electrode for applying a field across the ink. The flat plate is best seen in FIG. 3 and may include plane glass coated with a transparent conductive layer of tin oxide which is a structure commercially available under the trade name of NESA glass.

The frame 52 holding the transparent flat plate 6 includes a cut out section 56 that permits radiation to pass from the lens 5 through the transparent plate 6 to ink between a processor and film sheet. The dimensions of the cut out are less than those of the flat plate to facilitate the mounting of the plate to the frame. The width of the cut out 56 is preferably equal to or slightly larger than the width of a cut out 49 in the film sheet. The use of fixedly mounted hooks 45 and 46 enables exact alignment of the cut out in the film sheet over the cut out in the frame. The length of roller 7 is preferably chosen to be slightly greater than the width of the frame cut out 56 and while the width of the processor sheet is preferably chosen equal to or slightly less than the length of the roller.

The processor sheet is a rectangular sheet that includes holes along the top and bottom similar to holes 43 in the film sheet. Only the holes at one end are used by mating with the fixedly mounted hooks 59 on the housing 2. The other end of the processor sheet is inserted into the slot 19 in roller 7. The torque spring 20 constantly urges the roller in a direction to maintain the processor sheet taut and its force must be overcome when inserting the processor sheet.

Preferably, the processor sheet is an insulating material with a high dielectric constant and strength whereas the film sheet may be composed of conductive material. One reason for the insulating property is simply to keep the high voltage drop coupled between the roller and flat plate from being shorted. Of course, the processor sheet and film sheet both may be highly insulating or the processor sheet conducting and the film sheet insulating. The shorting problem is acute if both are good conductors. The processor sheet preferably has a thickness in the range of 2 to 25 microns to keep the distances between the applied voltages small to obtain a high field strength, i.e. volts per micron. The processor sheet may include an insulating material facing the film sheet with a conducting backing coupled to the roller.

FIG. 7 illustrates how the housing 2 couples to the frame 52 and how the access door 16 is hinged in the housing. The frame includes a recess 60 located adjacent the hooks 45 that mates with the bottom curved portion 61 of the door thereby locking the top of the housing to frame 52. The door is pivotedly hinged by pins 62 and may be opened when the housing and frame are coupled together. The bottom of the housing is coupled to the frame by means of the slot 63 in the housing and the locking pin 64 in the frame (FIG. 2). The bellows is, of course, coupled to the frame 52. Together, the housing 2, frame 52 and bellows 4 create a light tight interior for the film sheet and processor sheet.

Another feature of the present invention novel to the photoelectrophoretic process is that ink spread across an image forming area is constrained between two sheets. Looking at FIG. 2, when the roller ruptures pod 9 the ink is released and can flow only downward and outward because of the electrical and mechanical pressures between the roller and flat plate. The processor sheet is tightly stretched over the film sheet because it is anchored at one end to the roller and at the other end by hooks 59. Basically, the presence of the processor sheet prevents ink released from the ruptured pod from scattering uncontrollably. In the embodiment where the processor sheet includes an insulating material backed by a conductive layer, the electrostatic force between the processor sheet and flat plate urges the two sheets together and the ink is at least partially "pumped" away from the roller. This results in a rapid inking of the film sheet and also enables excess ink to be collected in the sump 67 at the bottom of the camera. The hooks 59 are positioned so the processor sheet is folded around the edge 68 of frame 52. This fold deflects excess ink into the sump in addition to maintaining the processor sheet taut. The voltage is normally removed when unwinding the processor sheet.

Although the instant invention is described in terms of a specific camera configuration, it is understood to include all modifications that retain the principal features of the invention.

The roller (FIG. 5) includes a conductive metal cylinder 17 and a conductive layer 18 of elastomeric material. The roller has a slot 19 (FIG. 2) for anchoring one end of the processor sheet and has a torque spring 20 coupled to its drive shaft 21 to urge rotation of the roller in a counterclockwise direction (as viewed in FIG. 2) to keep the processor sheet taut.

The drive mechanism (FIG. 5) for imparting translational movement to the roller over the film sheet includes the electric motor 22 coupled to the roller through the closed loop link chain 23. The chain is carried on sprockets 24 and 25 with sprocket 24 being coupled directly to the motor. The chain is fixidly coupled to the roller and pulls it back and forth across the film sheet. The rotational direction of the motor power shaft coupled to sprocket 24 is, of course, reversible. The movement of the roller is controlled by guide slots cut into the brackets 26 and 27. The collars 28 and 29 are rotatably mounted on the roller shaft 21 and mate with a guide slot 30 (FIG. 6). The collars include a flange 32 to keep them mated to the slot in the brackets. The guide slots in each bracket include the ramp portion 33 which is positioned at the top of the camera (as viewed in FIG. 2) raise the roller off the film sheet. When the chain pulls the roller downward toward its turn position at the other end of the slot, the roller periphery comes into contact with the pod and ruptures it if not already ruptured. The location of the brackets 26 and 27 relative to the flat plate 6 establish the pressure exerted by the roller on the film sheet. The roller includes the elastomer layer 18 so as to comply with the shape of the film sheet.

The drive mechanism for imparting rotation to the roller as it travels over the film sheet includes the pinion gears 34 and 35 fixidly coupled to the roller shaft 21 and operatively engaged with the linear rack gears 37 and 38. As the roller is pulled along by the chain, the pinion gears are rotated by the rack gears which in turn rotate the roller 7.

The diameter of the roller is preferably selected so that the processor sheet is not wrapped onto itself at least in the copy areas. If the circumference of the roller is selected to be generally equal to or greater than the length of the processor sheet, no overwrap will occur. The overwrap is harmful especially if the processor sheet does not include a conductive backing because the field strength is increased if the distance between the conductive roller and tin oxide on plate 6 is increased which occurs if the processor sheet is allowed to wrap onto itself when being wound onto the roller.

Figure 1:
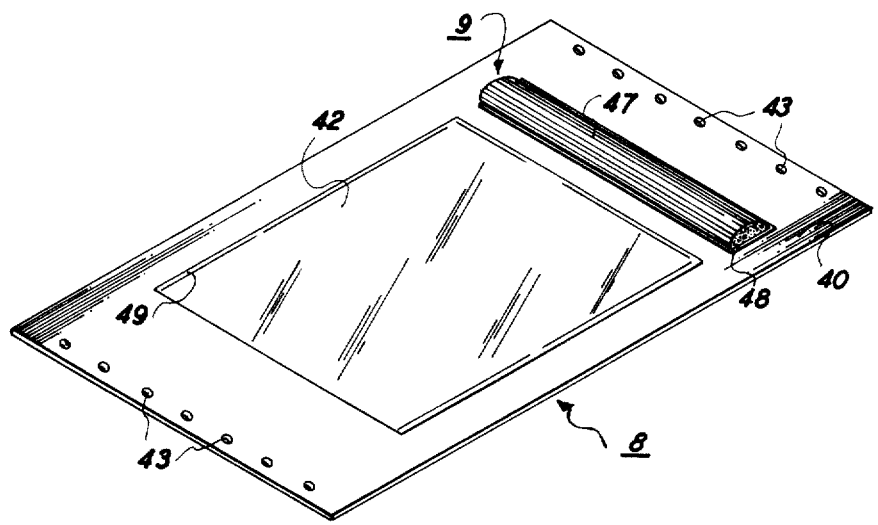
FIG. 1 is a schematic perspective illustration of the film sheet employed in the instant camera.

FIG. 1 illustrates the film sheet. It includes an opaque backing 40, the rupturable pod 41, the transparent image or copy forming area 42 and the holes 43. Backing 40 is preferably bond paper with good mechanical strength. The holes are punched into it to facilitate anchoring the film sheet on the hooks 45 and 46 fixedly connected to the body of the camera (FIG. 2). The ink pod is made with a non-porous material 47 shaped like a bag in which a photoelectrophoretic ink is housed. The bag is coupled to a base 48 which is in turn glued on otherwise fixedly attached to the backing 40. The transparent portion 42 is a readily available polymeric material such as a plastic commercially available under the name MYLAR. Preferably, the thickness of the transparent sheet 42 is between 2-25 microns because the material is highly insulating and it is desirable to maintain the conductive tin oxide layer on the flat plate as close as possible to the conductive portion of the processor sheet for high electric fields.

The transparent material 42 is layed over a cut out portion 49 in the backing. The cut out is to allow radiation to pass from the lens 5 to ink on the transparent material. The transparent sheet is larger than the cut out by some amount to provide a common surface area for attaching sheet 42 to backing 40. The transparent sheet is preferably fixed to the backing so that it can be conveniently peeled off the backing after an ink image is formed on it. The image dimensions are limited by those of the cut out 49. The ink pod is generally the same width as the cut out but even when it is smaller, the flow of ink is sufficient to cover most of the transparent sheet. Preferably, the ink pod is on the opposite side of the backing 40 from the transparent sheet. This means that when the transparent sheet is separated from the backing after an image has been formed on it, the image or copy will have a border in the shape of the cut out 49.

Turning now to FIG. 3, the film sheet is inserted into the camera by mating the holes 43 with the hooks 45 and 46 on the frame 52 supporting the flat plate 6. It is easiest to insert the hooks 45 through the top set of holes 45 (those nearest the pod) before firing the other end of the film sheet to hooks 46. Hooks 46 are mounted on the journeled shaft 53 that includes the handle 54. The handle is rotated clockwise to insert hooks 46 through the bottom set of holes (the holes further from the pod) on the film sheet. Thereafter, the handle is rotated counterclockwise to tightly stretch the film sheet over the flat plate. The locking pin 55 is engaged with a slot to lock the shaft 53 in the counter-clockwise position. The film sheet is removed from the camera simply by withdrawing the lock pin from the locking slot and rotating the handle clockwise.

What is claimed is:

1. Photoelectrophoretic imaging apparatus comprising
   a plate,
   a film sheet positioned over said plate having an image forming portion and a rupturable pod for containing photoelectrophoretic ink,
   a roller supported for rotational and translational movement relative to said plate for rupturing said rupturable pod and for spreading ink contained within said rupturable pod,
   a processor sheet adjacent said film sheet fixedly anchored at one end relative to said plate and coupled to said roller at the other end so as to be wound onto said roller as said roller moves across said plate and unwound from said roller as said roller returns near its initial position,
   means for coupling a voltage difference between said roller and said plate across said ink between said sheets to cause particle deposition and migration, and
   exposure means for exposing ink between said sheets to activating electromagnetic radiation, whereby an ink copy is formed on said image forming portion of said film sheet after ink in said pod is spread between said sheets.

2. The apparatus of claim 1 wherein said exposure means includes means for projecting a full frame image onto said ink sandwiched between said film sheet and said unwound processor sheet.

3. The apparatus of claim 1 wherein said roller includes a conductive elastomeric layer on its outer periphery.

4. The apparatus of claim 1 wherein said film sheet includes an opaque backing having a cut out portion over which a transparent sheet of greater dimensions is mounted on a side of the backing opposite the rupturable pod.

5. Photoelectrophoretic imaging apparatus comprising
   a plate,
   a film sheet positioned over said plate having an image forming portion and a rupturable pod for containing photoelectrophoretic ink,
   a roller supported for rotational and translational movement relative to said plate for rupturing said rupturable pod and for spreading ink contained within said rupturable pod,
   a processor sheet adjacent said film sheet fixedly anchored at one end relative to said plate and coupled to said roller at the other end so as to be wound onto said roller as said roller moves across said plate and unwound from said roller as said roller returns near its initial position said processor sheet including a conductive backing facing said roller,
   means for coupling a voltage difference between said conductive backing on said processor sheet and said plate across said ink to cause particle deposition and migration, and
   exposure means for exposing ink between said sheets to activating electromagnetic radiation, whereby an ink copy is formed on said image forming portion of said film sheet after ink in said pod is spread between said sheets.

6. The apparatus of claim 5 wherein said exposure means includes means for projecting a full frame image onto said ink sandwiched between said film sheet and said unwound processor sheet.

7. The apparatus of claim 5 wherein said roller includes a conductive elastomeric layer on its outer periphery.

8. The apparatus of claim 5 wherein said film sheet includes an opaque backing having a cut out portion over which a transparent sheet of greater dimensions is mounted on a side of the backing opposite said rupturable pod.

* * * * *